March 17, 1931. W. G. WILSON 1,796,904
EPICYCLIC GEAR
Filed Feb. 7, 1929  2 Sheets-Sheet 1

W. G. Wilson
INVENTOR

By Marks & Clerk
Attys.

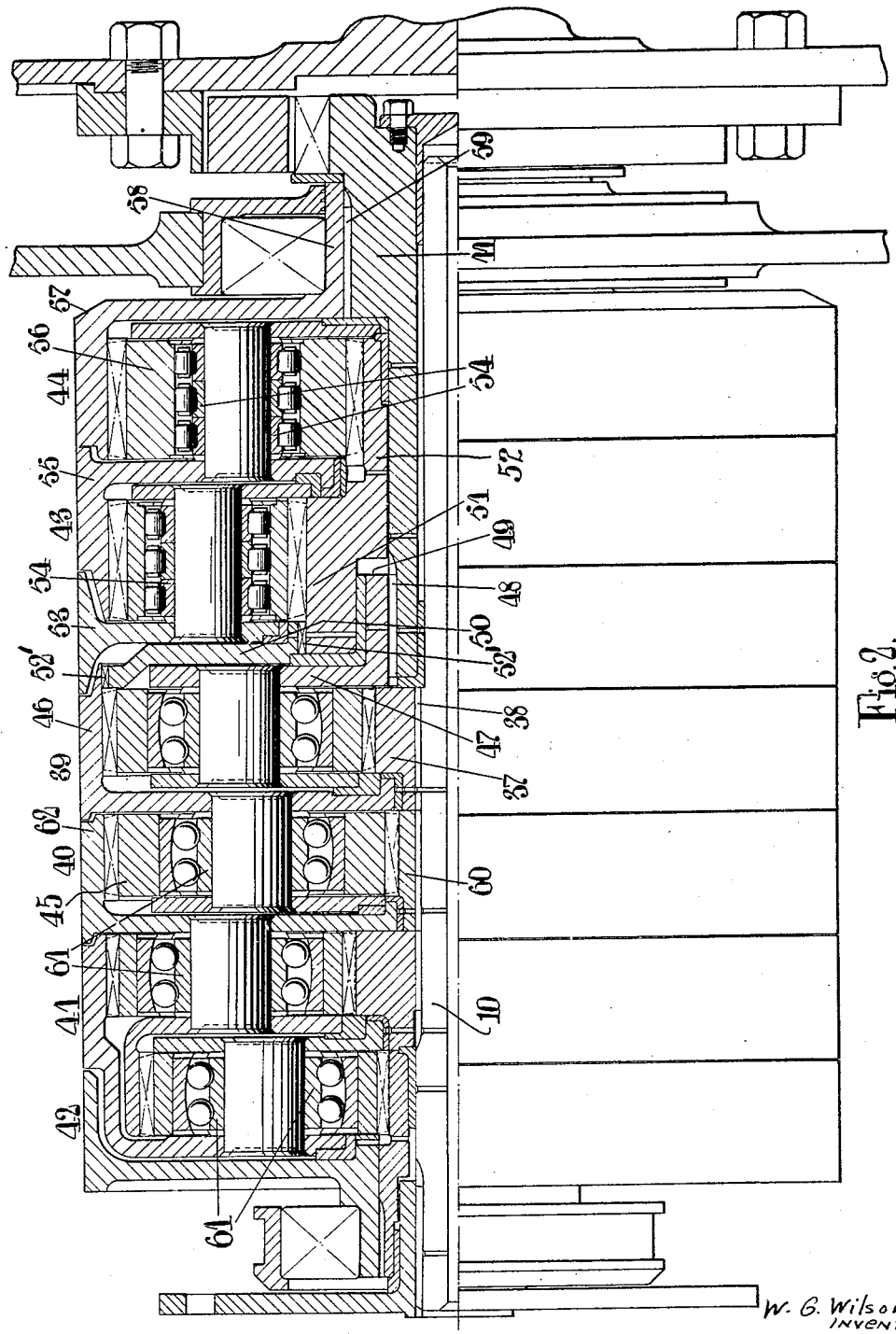

Patented Mar. 17, 1931

1,796,904

UNITED STATES PATENT OFFICE

WALTER GORDON WILSON, OF WESTMINSTER, LONDON, ENGLAND

EPICYCLIC GEAR

Application filed February 7, 1929, Serial No. 338,310, and in Great Britain February 20, 1928.

This invention relates to epicyclic gearing and has particular reference to that kind in which the gears are compounded and is an improvement on the gear described in the specification of my United States Patent No. 1,404,675.

In that patent specification there is described a change speed gear for use on self-propelled vehicles which comprises three forward speeds and if necessary the addition of a direct drive speed as well as a reverse.

One object of the present invention is an improved construction of such a form of change speed gear in which should the lowest speed not have sufficient torque for driving a heavily loaded vehicle, an emergency low speed may be brought into action so that the gear then possess four speeds which can, if necessary, be supplemented by a direct drive and a reverse.

Another object of the invention is a change speed system in which from a basic group, compounding of the gears for a light torque and higher speed is obtained and wherein compounding may also be obtained for a heavier torque and lower speed.

A further object of the invention is to obtain a system of gear stepping up or down which is more progressively graduated, by the insertion of one or more auxiliary groups.

The invention consists in an epicyclic compound gear, wherein from a central sun pinion in a gear box one or more emergency compounded lower speeds are obtainable.

The invention also consists in an epicyclic compound gear wherein from one side of a central sun pinion in a gear box a number of speeding up groups are obtainable, while on the other side of such pinion one or more slowing down speed groups are obtained, with or without a direct drive and a reverse.

The invention will now be described with reference to the accompanying drawings which illustrate three forms of epicyclic or concentric gear constructed in accordance with the present invention, and in which:—

Figure 1:
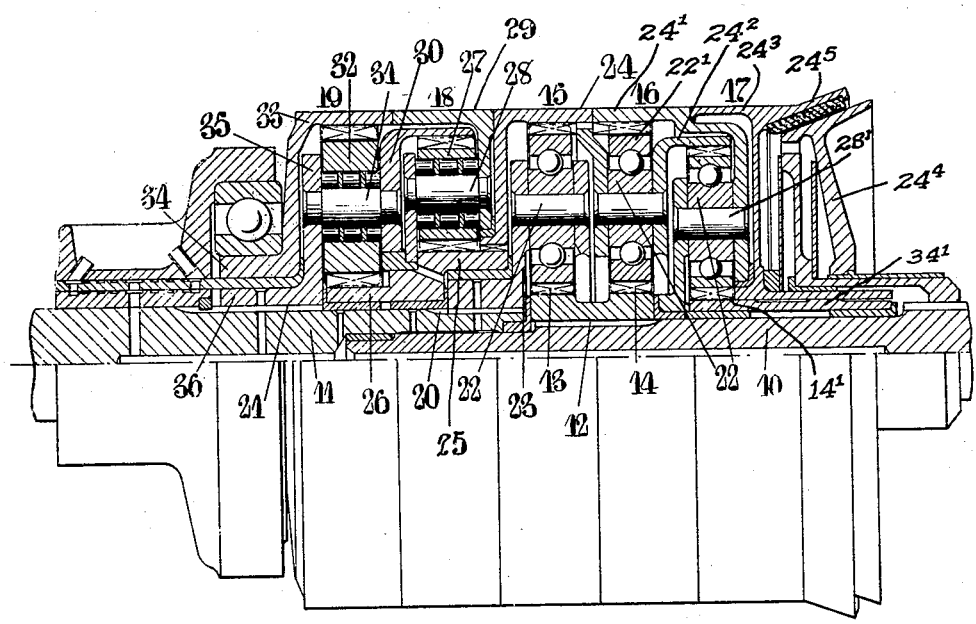

Figure 1 is a longitudinal half sectional elevation of a gear box in which there are provided in addition to three forward speeds an emergency fourth lower speed as well as a direct drive and a reverse.

Figure 3:
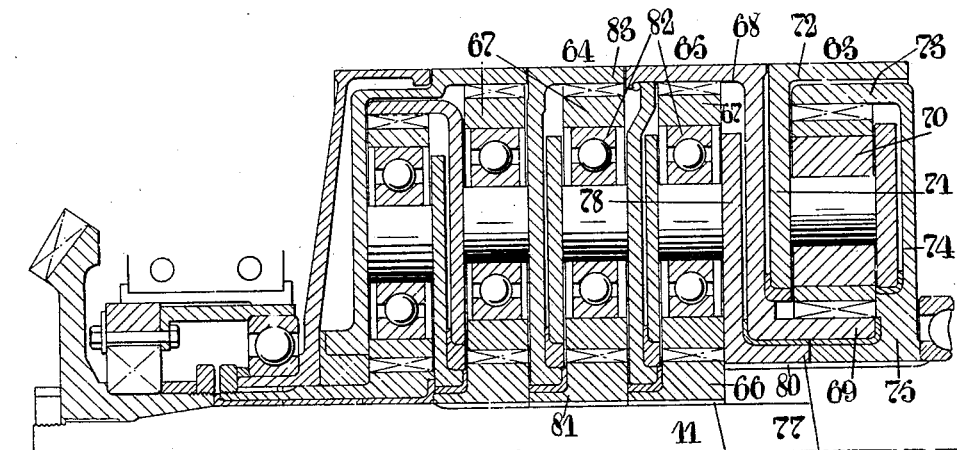

Figure 2 is a similar half sectional elevation of a form of epicyclic gear in which there is provided four ordinary compounded forward speeds with the addition of two emergency compounded lower speeds, the gear box thus having six forward speeds, and Figure 3 is a similar sectional elevation of a form of gear box in which four forward speeds are provided with an emergency low speed without there being provided either a direct drive or reverse.

Referring now to Figure 1, 10 is the driving shaft which is centrally arranged and extends for some distance, within the driven shaft 11. Splines or keys 12 are provided on the driving shaft 10 to provide the rotation necessary for a pair of sun pinions 13 and 14.

From these two pinions the drive is initiated for groups 15, 16 and 17 for higher rotational speeds and lighter torque, whilst on the other side of group 15 there is a group 18 which constitutes an emergency low speed element and such group is followed by a final reversing group 19. 20 and 21 on the driven shaft represent splines or keys whereby the driven shaft receives its driving effort as will be explained. In gear with the sun pinion 13 are planet pinions 22 supported upon a carrier 23 which is inwardly extended radially to form a boss internally keyed to engage the splines 20 on the driven shaft 11.

The group 15 also comprises an internally toothed annulus 24 which is formed of somewhat channel shape to embrace or accommodate the planet pinions 22.

These latter are in gear with the annulus 24 and if it is assumed that the annulus is held stationary by means of a suitable brake or reaction band, it will be clear that the rotation of the sun pinion 13 will endeavour to rotate the planet pinions 22 around their own axes, but as the corresponding annulus 24 is held stationary the pinions are prevented from rotating while their axes remain stationary and consequently they and the carrier 23 are caused to progress orbitally around the driving shaft and this movement is transmitted in the form of a driving effort to the driven shaft through the splines 20.

The speed of the driven shaft produced in this way through the group 15 is the lowest speed that has hitherto been obtained through the agency of epicyclic gearing. In order to obtain a still lower emergency speed the annulus 24 is radially extended inwardly and is fitted at its centre with a compound pinion comprising two integral pinions 25 and 26 of different diameters.

The pinion 25 constituted by the larger diameter is in gear with a set of planet pinions 27, the centre axle 28 of which is mounted in and carried by an annulus 29 which at its outer diameter is adapted to receive the usual form of brake or reaction band so that it may be held still or released in the ordinary way. The outer periphery of the planets 27 is engaged with the internal teeth of a combined free annulus and carrier 30, such member supporting the axle pins 31 of a second set of planets 32 which form part of the speed group 19.

The inner periphery of the planets 32 are in engagement with the smaller pinion 26 of the compound pinion, while their outer peripheries are in gear with internal teeth formed upon an annulus 33 which is carried upon a supporting sleeve 34 surrounding the driven shaft. The axle pins 31 of the planets 32 are also supported at the other end by a carrier 35 which has a central boss 36 internally toothed to engage the splines 21 on the driven shaft.

The operation of such a gear is as follows:

Assuming that the annulus 24 is held fixed, the rotation of the sun pinion 13 will cause the planets 22 to orbitally progress around the centre shaft 10 causing the carrier 23 to impart a drive to the driven shaft 11.

To bring the emergency group 18 into operation the annulus 29 is now fixed, the annulus 24 being released. The release of this annulus 24 will permit it to rotate through the planet pinions 22 from the sun pinion 13 so that the compound pinions 25 and 26 will rotate with the annulus 24. The planets 27 are, however, prevented from orbital movement by the locked annulus 29 so that the rotation of the planets 27 produce a compound drive on the free annulus 30 and it passes its drive through the carrier 35 on to the driven shaft 11.

It will be understood that the low speed obtained through the agency of the group 15 is further reduced by being transmitted to the driven shaft through the group 18, that is to say, the groups 15 and 18 are compounded to obtain a lower speed than that obtainable solely from the group 15.

To now give a reverse speed to the driven shaft by means of the group 19, the annulus 33 is held whilst 29 being released permits the planets 27 to make an orbital movement and thus drive the planets 32 which are also in gear with the smaller pinion 26 so that a reverse rotation of the planets is obtained for the direct drive as desired.

The sun pinion 14 initiates the movement of the speeding up groups 16 and 17 which are adapted to be compounded with the group 15 to produce higher speeds than that obtainable solely through the agency of such group. Planet pinions 22' engage with the sun pinion 14 and with the internal teeth of an annulus 24' which supports the axle pins 28' of planet pinions $22^2$ and is adapted to be braked in the usual way. The axle pins of the pinions 22' are carried by an extension of the annulus 24 and by another annulus $24^2$ having internal teeth for engaging the pinions $22^2$, which latter also engage with a sun pinion 14' rigid with a sleeve 34' which surrounds the driving shaft 10 and is fitted with an external disc $24^3$ also adapted to be braked.

The operation of the speeding up groups 16 and 17 is as follows:—

Assuming that the annulus 24' is braked the planets 22' perform an orbital movement and carry round the annulus 24 thus producing a faster orbital movement of the planets 22 than would be the case if the annulus 24 was maintained stationary. Hence a faster drive is imparted to the driven shaft 11 through the carrier 23 by the compounding of the groups 15 and 16 than that obtainable through the agency of the group 15 alone.

If the annulus 24' is now released and the disc $24^3$ is braked, the sun pinion 14' is held stationary so that the groups 15, 16 and 17 are compounded to produce a further speeding up of the driven shaft.

For the direct drive, the end of the driving shaft adjacent the speed group 17 is fitted with a clutch, one element $24^4$ of which is carried on the driving shaft 10, while the other $24^5$ is rigid with the disc $24^3$, carrying the sun pinion 14' of the speed group 17. When the clutch element $24^4$ is actuated to engage the element $24^5$ the gears of the groups 15, 16 and 17 are locked and a direct drive is obtained.

Referring now to Figure 2, a similar system is illustrated whereby two lower speeds are obtainable.

The sun pinion 37 is splined at 38 on the driving shaft 10, and 11 is the driven shaft as before.

The group 39 would represent the lowest speed obtainable according to the United States patent hereinbefore referred to and by groups 40, 41 and 42 the speed in an upward direction is compounded, whilst the groups 43 and 44 to the right of 39 the speed is compounded downwards.

The sun pinion 37 has corresponding planets 45 which engage an internally toothed annulus 46 which may be braked when desired and thus when the annulus 46 is braked, the planets 45 on their carrier 47 will make orbital progression around the driven shaft and impart a drive thereto by the splines 48 which engage corresponding splines on the boss 49 of the carrier.

The annulus 46 is extended inwardly and radially at 50 to be brought into operative connection with a compound pinion having a larger diameter 51 and a smaller diameter 52.

For convenience in manufacture, such a fitting is made in three sections separated by serrated connecting parts indicated at 52'.

To obtain the first emergency lower speed an intermediate carrier is shown at 53, such carrier supporting the axes of planets 54 of group 43.

Such planets 54 are in mesh internally with the larger compound pinion 51 whilst externally the planet pinions engage an internally toothed annulus 55 which is at its exterior adapted to be braked when desired.

From the foregoing it will be understood that when the annulus 46 is freed and 53 is braked, the planets 54 are prevented from performing orbital progression, whilst the released annulus 46 will now be rotated by the sun pinion 37 through planets 45 and thus drive the pinions 51 and 52.

Under these conditions the planets 54 which are held from orbital movement, are caused to rotate on their own axes by the pinion 51 and thereby impart compound rotation to the annulus 55. Such annulus 55 gives orbital progression to the planets 56 of group 44, and such planets are rotated on their axes by the smaller sun pinion 52 and they in turn rotate the annulus 57 which extends inward radially and is bossed at 58 to drive on to the splines 59 on the driven shaft 11.

If now it is desired to obtain a further low emergency speed the annulus 53 is released but the annulus 55 is now braked. This has the effect of holding the planets 56 from orbital movement but as the smaller pinion 52 continues rotating, the rotation of the pinions will cause the rotation of the annulus 57 to drive the shaft as before but at a different ratio.

The annulus 57 is in the present instance used as a braking element for the speed given out to the driven shaft to check the speed of rotation whenever it is desired.

By means therefore of the initial sun pinion 37 and the compound pinions 51 and 52 two compounded lower speeds than that produced by the group 39 is obtainable.

To the left of the group 39 three other speeds are shown as possible but this implies the addition or interposition of a group 40 which gives in comparison with the gear shown in Figure 1, an additional higher speed. This additional speed is obtained by the sun pinion 60 which is in gear with planets 61 and these in turn gear with the internally toothed annulus 62. The planets are carried by an inward radial extension of the adjacent annulus 46 so that the drive will be as follows:

When the annulus 62 is braked, the annulus 46 being released, the rotation of the sun pinion 60 will not allow rotation of the planets 61 about their own axes and therefore the planets will orbitally progress and cause the annulus 46 to rotate at a different speed to that given by the sun pinion 37. Thus the resulting difference of speed between the annulus 46 and the sun pinion 37 produces a proportionate orbital movement of the carrier 47 which is transmitted to the driven shaft as already described by the splines 48.

The speed groups 41 and 42 are equivalent to the groups 16 and 17 described in connection with Figure 1.

By the foregoing construction a gear box is obtainable having six forward speeds.

The drawing does not illustrate either a reverse or make provision for a direct drive but it is to be understood that these details may be added. Moreover, it is to be noted that besides the interposition of a group 40 other additional groups might be combined in the system to give various other gear ratios as required.

Referring now to Figure 3, this illustrates a gear box in which five forward speeds are obtainable, without either a direct drive or reverse.

In this construction one emergency lower speed is obtainable by a group 63 which does not include the compound pinion hereinbefore described. Moreover, the additional group 64 is shown for supplementing the upward speed groups. The added groups 63 and 64 are arranged on respectively opposite sides of the group 65.

The driving shaft 11 by means of splines 12 drives a sun pinion 66, the planets 67 of which gear with an internally toothed annulus 68 adapted to be braked in the usual manner.

The annulus 68 is extended inwardly to constitute a driving pinion 69 in the next group 63, the planets 70 of which are carried on a carrier 71 which is formed with an annulus 72 which is adapted to receive a brake band.

The exterior of the planets gears with an internally toothed annulus 73 which by a radial extension 74 conveys the movement to a pinion 75 splined at 76 to the driven shaft 77.

The planets 67 are supported on a carrier 78 which is also extended inward radially to form a pinion 79 splined at 80 to the driven shaft 77.

When therefore the annulus 65 is braked, orbital rotation of the planets 67 impart their drive to the driven shaft 77 by means of pinion 79.

By releasing annulus 65 and locking annulus 72 the rotational movement of annulus 65 drives pinion 69 constituting sun pinion of group 63; but as the pinions 70 are prevented from orbital movement by the holding of annulus 72, the internally toothed carrier 73 will be caused to rotate and directly drive the shaft 77 through the pinion 75.

The inserted higher speed constituted by the group 64 comprises the sun pinion 81 engaging planets 82 which are in gear with the internally toothed annulus 83 of the next higher speed. Such planets 82 are carried by an inward extension of the annulus 68 so that when the annulus 83 is braked and the annulus 65 released, the operation of the sun pinion 81 will impart orbital progression to the annulus 68 and this being in engagement with the planet 67 which are also in engagement with their sun pinion 66 will cause a difference of speed between the annulus 65 and sun pinion 66 which will be indicated by the orbital movement of the planet 67 whereby the carrier 78 will exert a drive upon the driven shaft at the compounded speed.

I claim:

1. In epicyclic gearing comprising a basic group of epicyclic gears, a driving shaft rigidly carrying the basic group sun pinion, a driven member in operative connection with said basic group, and a rotatable toothed annulus in engagement with the basic group planet pinions so that the motion of the driving shaft may be transmitted to the driven member at a reduced speed through the basic group of gears by locking the said annulus against rotation, the combination of a supplementary group of epicyclic gears having its sun pinion rigidly connected to the said annulus, supplementary transmission means operatively connecting the supplementary group to the driven member, and means whereby the planet pinions of the supplementary group may be locked against orbital movement to enable an emergency low forward speed resulting from the compounding of the basic group with the supplementary group to be transmitted through the supplementary transmission means to the driven member.

2. In epicyclic gearing comprising a basic group of epicyclic gears, a driving shaft rigidly carrying the basic group sun pinion, a driven member in operative connection with said basic group, and a toothed annulus in engagement with the basic group planet pinions so that the motion of the driving shaft may be transmitted to the driven member at a reduced speed through the basic group of gears by locking the said annulus against rotation, the combination of two supplementary groups of epicyclic gears having a compound sun pinion rigid with the said annulus, supplementary transmission means operatively connecting the supplementary groups to the driven member, means whereby the planet pinions of the first supplementary group may be locked against orbital movement to enable an emergency low speed resulting from the compounding of the basic group with the first supplementary group to be transmitted through the supplementary transmission means to the driven member, and means to enable another emergency low speed resulting from the compounding of the basic group with both of the supplementary groups to be transmitted through the supplementary transmission means to the driven member when the planet pinions of the second supplementary group are locked against orbital movement.

3. Epicyclic gearing as claimed in claim 1, in which the means for locking the supplementary group planet pinions against orbital movement and for imparting the emergency low speed to the driven member comprise a rotatable annulus which together with a rotatable disc supports the axle pins of such planet pinions, means whereby said annulus may be locked against rotation, and an internally toothed annulus which meshes with the said planet pinions and is operatively connected to the driven shaft.

4. In epicyclic gearing as claimed in claim 1, and in which the means for locking the supplementary group planet pinions against orbital movement comprises a rotatable annulus which is adapted to be braked and which together with a rotatable disc supports the axle pins of the said pinions, the combination of means whereby a reverse drive is obtained, such means comprising an additional group of planet pinions supported by a carrier and an internally toothed free annulus which respectively engage the driven member and the supplementary group planet pinions, the said additional planet pinions intermeshing with a sun pinion forming a rigid extension of the supplementary group sun pinion and with a further toothed annulus adapted to be braked to enable the orbital movement of the additional group planet pinions to impart the reverse drive to the driven member through the said carrier.

5. In epicyclic gearing comprising a basic group of epicyclic gears, a driving shaft rigidly carrying the basic group sun pinion, a driven member in operative connection with said basic group, and a toothed annulus in engagement with the basic group planet pinions so that the motion of the driving shaft may be transmitted to the driven member at a reduced speed through the basic group of gears by locking the said annulus against rotation, the combination of means whereby two emergency compounded low speeds may be obtained comprising a compound sun pinion rigid with the annulus of the basic group of gears, two supplementary groups of planet pinions gearing with said sun pinion, an annulus and a disc carrying the first such group of pinions, means whereby such annulus may be locked against rotation, an internally toothed annulus and a disc carrying the planets of the second supplementary group of planet pinions, which latter annulus gears with the first such group of pinions, means whereby said toothed annulus may be locked against rotation, and a further internally toothed annulus in engagement with the said second group of planet pinions and with the driven member.

6. In an epicyclic gear assembly comprising a basic group of gears, a driving shaft rigidly carrying the basic group sun pinion, a driven shaft in operative connection with a carrier supporting the basic group planet pinions, and a rotatable toothed annulus in engagement with such planet pinions so that the motion of the driving shaft may be transmitted to the driven shaft at a reduced speed through the basic group of gears by locking the said annulus against rotation, the combination of additional groups of epicyclic gears disposed on each side of the basic group, each such additional group having associated therewith an element adapted to be separately locked against rotation, means whereby the said reduced speed of the driven shaft may be augmented by releasing the basic group annulus and locking the said element of an additional group of gears on one side of the basic group, and means whereby the said reduced speed may be further reduced by releasing the basic group annulus and locking the said element of an additional group of gears on the other side of the basic group.

In testimony whereof I have signed my name to this specification.

WALTER GORDON WILSON.